Figure 1:
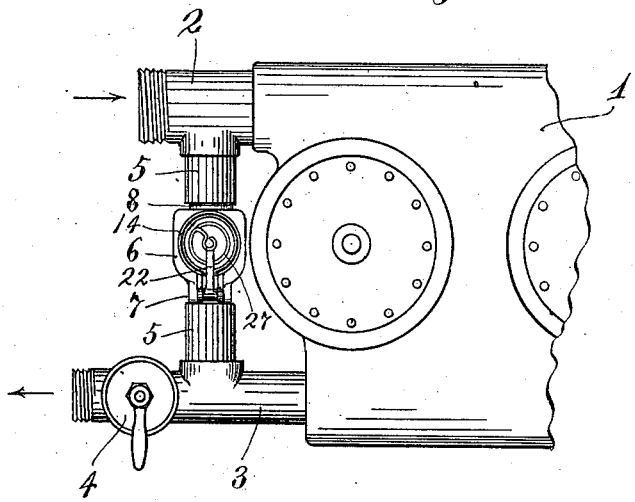

T. J. PAGEL.
RELIEF VALVE FOR FIRE ENGINES.
APPLICATION FILED AUG. 20, 1910.

996,125.

Patented June 27, 1911.

2 SHEETS—SHEET 1.

Witnesses.
A. H. Opsahl.
H. D. Kilgore.

Inventor
T. J. Pagel
By his Attorneys
Williamson Merchant

T. J. PAGEL.
RELIEF VALVE FOR FIRE ENGINES.
APPLICATION FILED AUG. 20, 1910.
996,125.
Patented June 27, 1911.
2 SHEETS—SHEET 2.
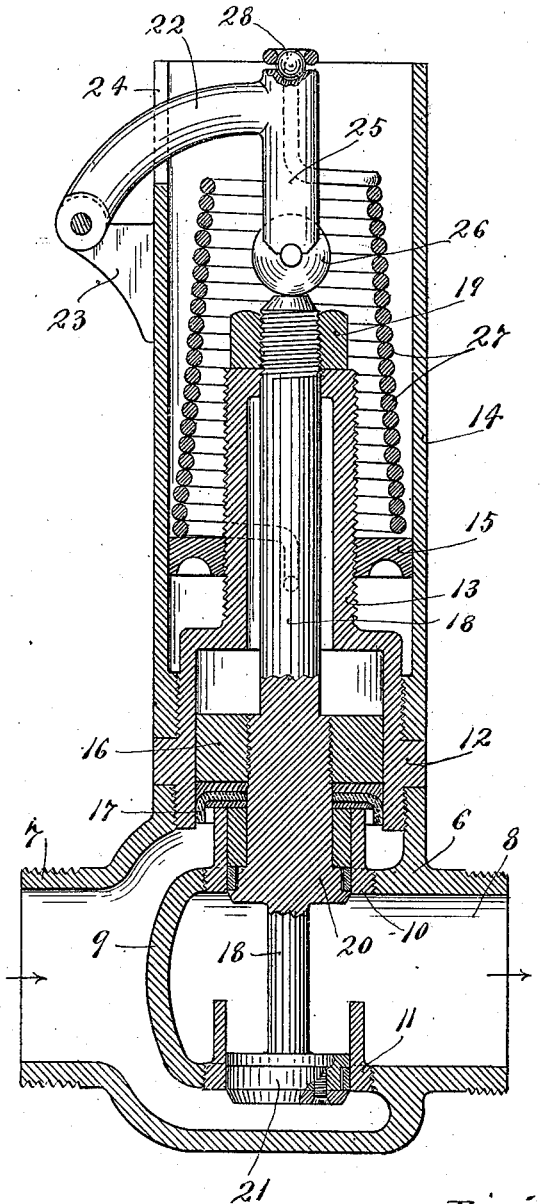
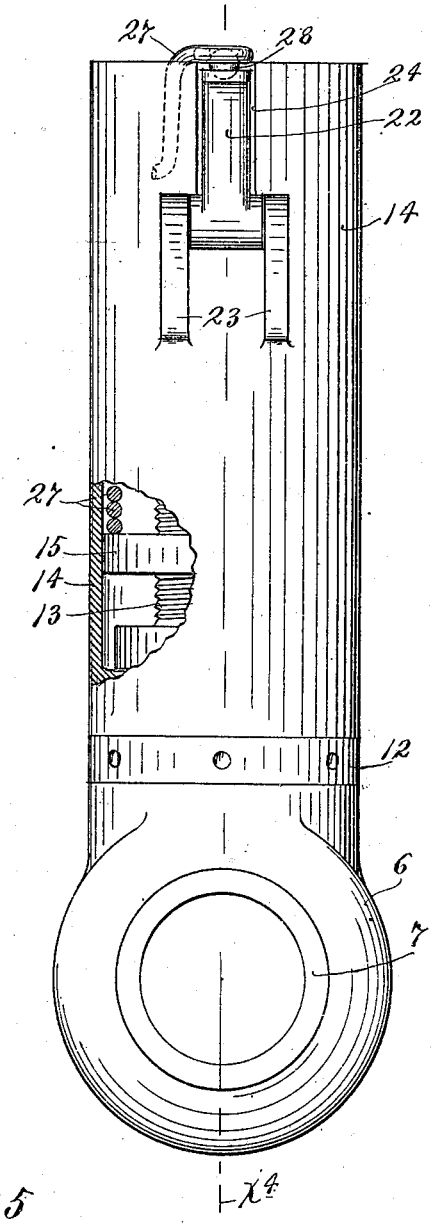
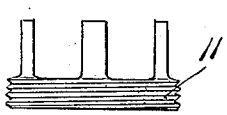

UNITED STATES PATENT OFFICE.

THEODORE J. PAGEL, OF MINNEAPOLIS, MINNESOTA.

RELIEF-VALVE FOR FIRE-ENGINES.

996,125.  Specification of Letters Patent. Patented June 27, 1911.

Application filed August 20, 1910. Serial No. 578,102.

*To all whom it may concern:*

Be it known that I, THEODORE J. PAGEL, a citizen of the United States, residing at Minneapolis, in the county of Hennepin and State of Minnesota, have invented certain new and useful Improvements in Relief-Valves for Fire-Engines; and I do hereby declare the following to be a full, clear, and exact description of the invention, such as will enable others skilled in the art to which it appertains to make and use the same.

My invention has for its particular object the provision of a simple and highly efficient relief valve mechanism for fire engines, but the improved relief valve is capable of general use wherever such device may be found convenient or desirable.

The invention consists of the novel devices and combinations of devices hereinafter described and defined in the claims.

It is a well known fact that abnormally high pressures, often sufficient to strain or break parts of the pumping mechanism of a fire engine, are produced by a sudden closing off of one of several hose pipes supplied with water, under high pressure, from the same fire engine. The spring devices employed in relief valves operate with increasing force under movements of the relief valve from closed into open position and, with such construction, it follows that the relief valve, when a high pressure is suddenly produced, will not open sufficiently to give the desired relief from the suddenly increased water pressure.

My invention involves as one of its important features, a spring device for normally holding the relief valve closed, arranged to operate under approximately the same tension on the said valve in all open positions as well as the closed position of the said valve. Such a spring device I designate as a constant tension spring device and it includes a differentially acting lever or spring shifting element which, as the tension of the spring is increased by opening the valve, inversely decreases the leverage, and hence, the effective pressure of the spring so that the resulting yielding pressure on the valve is kept constant, or substantially so. This arrangement permits the valve, when subject to a determined water pressure, to open rapidly and to a very considerable extent so as to give the desired quick relief from the abnormal water pressure.

In the accompanying drawings which illustrate the invention in its preferred form, like characters indicate like parts throughout the several views.

Figure 2:
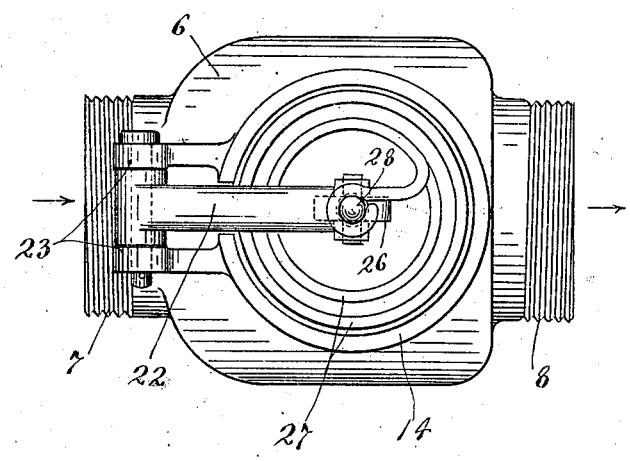

Referring to the drawings; Figure 1 is a fragmentary plan view showing a portion of the pump of a fire engine and illustrating my invention as applied thereto; Fig. 2 is a plan view of the improved relief valve removed from working position; Fig. 3 is a side elevation of the relief valve; Fig. 4 is a vertical section taken on the line $x^4$ $x^4$ of Fig. 3, some parts being shown in full; and Fig. 5 is a side elevation showing in detail one of the valve seats of the relief valve mechanism.

The casing or body of a fire engine pump is indicated as an entirety by the numeral 1 and it is provided with the customary water inlet 2, and water discharge 3, in which latter is shown a cut off valve 4 of the usual design. The inlet 2 and outlet 3 are connected by a by-passage which is, as shown, afforded by short pipe sections 5, and the base member 6 of the valve casing of my improved relief valve mechanism. The by-passage noted, within the casing 6, is divided into receiving and discharging compartments 7 and 8, respectively, by means of an approximately horizontal partition web 9 provided, as shown, with vertically alined upper and lower bushings 10 and 11.

At its top, the casing 6 is provided with internally threaded sleeve, the end of which is screwed to the lower end of a cylindrical piston seat 12, having a reduced and externally threaded upper end extension 13. A cylindrical outer casing 14 is, as shown, also screw threaded at its lower end on the cylinder 12. A vertically adjustable spring anchoring collar 15 is located within the casing 14 and has screw threaded engagement with the cylinder extension 13.

Working within the cylinder 12 is a piston head 16 provided, as shown, on its lower side with a self seating packing 17 that forms a water tight joint with the cylinder 12. The cylinder head 16, as shown, is of annular form and is screwed on to the long vertically extended stem 18, the upper end of which is passed upward through the cylinder extension 13 and provided with a nut 19 which limits the downward movement of said stem and parts carried thereby. Just below the packing 17, the piston stem 18 is provided with a smaller piston head 20 that works with a water tight joint in the upper bushing 10, and together with the piston head 16, constitutes a sort of differential piston. Below the piston head 20, the stem 18 is shown as reduced in diameter and to the extreme lower end of this reduced portion is secured a valve in the form of a piston head 21 and this works with a water tight joint in the lower bushing 11. By reference, particularly, to Fig. 4, it will be noted that in the lowermost or normal position of the valve stem 18, the lower piston head 21 is positioned in the lower continuous portion of the bushing 11 so that it thereby normally closes communication between chambers 7 and 8 of the casing 6, and hence, of course, closes the by-passage between the inlet and outlet of the pump casing. The upper portion of the said bushing 11 (see Fig. 5) is notched or cut out so that when the valve stem 18 and valve or piston head 21 are raised, communication will be opened up between the chambers 7 and 8 of the casing 6, and the by-passage between the inlet and outlet of the pump casing will thereby be opened so as to short circuit the pump through the said by-passage.

A differentially acting lever 22 is, as shown, pivoted to the lugs 23 on the exterior of the upper casing 14 and works through a slot 24 in said casing. The free end of this lever is vertically extended to form a bearing head 25, which might directly engage with the upper end of the piston stem 18 but is preferably provided with an anti-friction wheel 26 which directly engages the upper end of said stem, but in effect, constitutes a part of the said bearing head.

A heavy coiled tension spring 27 is anchored at its lower end to the adjustable anchoring collar 15 and at its upper end is anchored to the head 25 of the differential lever 22. Preferably, the upper end of the spring 27 is formed with an eye and is coupled to the head 25 by a ball 28 seated in the said eye in a depression in said head. The lower end of the spring 27 is preferably bent in the form of a hook and engaged with a peripheral notch in the anchoring collar 15, as shown in Fig. 3. Said spring 27 is tapered or reduced in diameter in the direction from its lower toward its upper end so that it will not engage the casing 14 when the upper end of the spring is moved upward and laterally to one side of the axis of the piston stem 18.

Operation: The operation of the improved relief valve mechanism is substantially as follows: By adjustment of the collar 15 the tension of the spring 27 will be set to hold the valve 18—21 closed under all pressure below the desired determined maximum pressure. The pressure of the water which is being circulated through the casing of the pump 1, at all times, exerts effective pressure upon the bottom of the valve 21 and on the marginal portion of the piston 16, tending to open the valve against the closing tension of the spring 27, and when the pressure exceeds the predetermined maximum, it will force the said valve into an open position, and the valve or piston 21 will be forced upward far enough to open communication through the bushing 11, between the chambers 7 and 8 of the lower valve casing 6. This, as is evident, will open communication between the inlet and outlet of the pump casing and will short circuit the pump upon itself.

The peculiar important action of the differential lever 22 and spring 27 may now be specifically described.

When the valve 21 is moved upward into an open position, the valve stem 18, of course, moves upward to the same extent and acts on the wheel or roller 26 moving the free end of the lever 22 upward. The wheel 26, throughout such vertical movements, travels on an arc which is substantially coincident with the vertical axis of the valve stem 18; but the bearing or coupling ball 28 which connects the upper end of the spring 27 to the lever 22 is located far above a horizontal line intersecting the pivotal support of the lever 22, and hence, will move on an arc or circle which quite rapidly moves to one side of the vertical axis of the said valve stem 18. This latter noted movement of the upper end of the spring causes the spring to rock into an inclined position within the casing 14 and shortens the effective leverage of the differential lever 22, at a rate which approximately counteracts the increasing tension in the spring itself. Otherwise stated, the said spring acting through the said differential lever is caused to exert approximately a constant pressure on the valve in all positions of the valve. The purposes of this action have already been noted.

Broadly, the result above stated, may be accomplished in different ways. The construction, I consider broadly new and desire to claim the same from the broadest kind of view.

What I claim is:

1. The combination with a pump, of a relief valve normally closing a water escape passage from the outlet of said pump, a differentially acting lever pivoted at one side of the axis of said valve and having an elongated head that is normally axially alined with said valve and operates thereon at its inner end, and a spring anchored to a relatively fixed part and to the outer portion of the head of said lever, substantially as described.

2. The combination with a pump, of a relief valve normally closing a water escape passage from the outlet of said pump, said valve being axially movable and having an axially extended stem, a differentially acting lever pivoted at one side of the axis of said valve stem and provided with a head that acts upon and is normally axially alined with the said valve stem, and a coiled spring surrounding a portion of said valve stem and a portion of said lever head, and anchored to a relatively fixed part at one end and at its other end anchored to the outer extremity of the head of said differentially acting lever, substantially as described.

In testimony whereof I affix my signature in presence of two witnesses.

THEODORE J. PAGEL.

Witnesses:
HARRY D. KILGORE,
B. G. WHEELER.

Copies of this patent may be obtained for five cents each, by addressing the "Commissioner of Patents, Washington, D. C."